(12) United States Patent
Song

(10) Patent No.: US 8,935,825 B2
(45) Date of Patent: Jan. 20, 2015

(54) WIPER BLADE ASSEMBLY

(75) Inventor: Kyoung Joon Song, Daegu (KR)

(73) Assignee: Cap Corporation, Daegu (KR)

( * ) Notice: Subject to any disclaimer, the term of this patent is extended or adjusted under 35 U.S.C. 154(b) by 0 days.

(21) Appl. No.: 13/552,425

(22) Filed: Jul. 18, 2012

(65) Prior Publication Data

US 2013/0340197 A1 Dec. 26, 2013

(30) Foreign Application Priority Data

Jun. 25, 2012 (KR) ........................ 10-2012-0067982

(51) Int. Cl.
*B60S 1/46* (2006.01)

(52) U.S. Cl.
USPC .................. 15/250.44; 15/250.46; 15/250.47; 15/250.201; 15/250.451

(58) Field of Classification Search
USPC ............... 15/250.32, 250.44, 250.46, 250.47, 15/250.201, 250.451, 250.452, 250.453, 15/250.454, 250.361
See application file for complete search history.

(56) References Cited

U.S. PATENT DOCUMENTS

| | | | |
|---|---|---|---|
| 2,697,241 A | 12/1954 | Oishei | |
| 2,782,445 A | 2/1957 | Krohm | |
| 2,782,447 A | 2/1957 | Anderson | |
| 2,782,449 A | 2/1957 | Anderson | |
| 2,814,820 A | 12/1957 | Elliott et al. | |
| 2,847,694 A | 8/1958 | Chambers | |
| 2,861,289 A | 11/1958 | Nesson | |
| 2,897,530 A | 8/1959 | Anderson | |
| 2,901,761 A | 9/1959 | Wallis | |
| 2,920,336 A | 1/1960 | Anderson | |
| 3,006,018 A | 10/1961 | Golub et al. | |
| 3,088,155 A | 5/1963 | Smithers | |
| 3,116,510 A | 1/1964 | Oishei et al. | |
| 3,176,336 A | 4/1965 | Scinta | |
| 3,179,969 A | 4/1965 | Glynn | |
| 3,192,551 A | 7/1965 | Appel | |
| 3,224,028 A | 12/1965 | Peras et al. | |
| 3,296,647 A | 1/1967 | Gumbleton | |
| 3,317,945 A | 5/1967 | Ludwig | |
| 3,418,679 A | 12/1968 | Barth et al. | |
| 3,605,168 A | 9/1971 | Moorhead et al. | |
| 3,641,614 A | 2/1972 | Newsome | |

(Continued)

FOREIGN PATENT DOCUMENTS

| | | |
|---|---|---|
| DE | 1028896 | 4/1958 |
| DE | 1247161 | 8/1967 |

(Continued)

OTHER PUBLICATIONS

Egner-Walter, Bruno, English Translation, Apr. 1999.*

(Continued)

*Primary Examiner* — Monica Carter
*Assistant Examiner* — Michael Jennings
(74) *Attorney, Agent, or Firm* — Harness, Dickey & Pierce, P.L.C.

(57) ABSTRACT

A wiper blade assembly including: a primary lever including a spoiler portion; and a secondary lever disposed on a side of the primary lever and hinge-coupled to the spoiler portion of the primary lever, wherein support portions are disposed on an inner surface of the spoiler portion of the primary lever and prevent the movement of the secondary lever. The support portions support the secondary lever to prevent the secondary lever from moving on the inner surface of the spoiler portion of the primary lever when a wiper is or is not in operation.

10 Claims, 5 Drawing Sheets

(56) References Cited

U.S. PATENT DOCUMENTS

| | | | |
|---|---|---|---|
| 3,798,703 A | 3/1974 | Den Berg et al. | |
| 3,818,536 A | 6/1974 | Plisky | |
| 3,845,519 A | 11/1974 | Quinlan et al. | |
| 3,881,214 A | 5/1975 | Palu | |
| 3,885,265 A | 5/1975 | Deibel et al. | |
| 3,899,800 A | 8/1975 | Wittwer et al. | |
| 4,045,838 A | 9/1977 | Porter | |
| 4,063,328 A | 12/1977 | Arman | |
| 4,126,911 A | 11/1978 | Mohnach et al. | |
| 4,296,522 A | 10/1981 | Brack | |
| 4,342,129 A | 8/1982 | Thompson | |
| 4,400,845 A | 8/1983 | Noguchi et al. | |
| 4,438,543 A | 3/1984 | Noguchi et al. | |
| 4,490,880 A | 1/1985 | Thompson | |
| 4,561,143 A | 12/1985 | Beneteau | |
| 4,570,284 A | 2/1986 | Verton | |
| 4,583,259 A | 4/1986 | Will | |
| 4,590,638 A | 5/1986 | Beneteau | |
| 4,802,257 A | 2/1989 | Edele et al. | |
| 4,807,326 A | 2/1989 | Arai et al. | |
| 4,852,206 A | 8/1989 | Fisher | |
| 4,866,812 A | 9/1989 | Arai | |
| 4,981,637 A | 1/1991 | Hyer | |
| 5,042,106 A | 8/1991 | Maubray | |
| 5,048,146 A | 9/1991 | Cavenago | |
| 5,133,104 A | 7/1992 | Maubray | |
| 5,138,739 A | 8/1992 | Maubray | |
| 5,189,752 A | 3/1993 | Longacre et al. | |
| 5,218,735 A | 6/1993 | Maubray | |
| 5,257,436 A | 11/1993 | Yang | |
| 5,283,925 A | 2/1994 | Maubray | |
| 5,325,563 A * | 7/1994 | Cayan | 15/250.46 |
| 5,325,564 A | 7/1994 | Swanepoel | |
| 5,383,249 A | 1/1995 | Yang | |
| 5,392,489 A | 2/1995 | Mohnach | |
| 5,463,790 A | 11/1995 | Chiou et al. | |
| 5,485,650 A | 1/1996 | Swanepoel | |
| 5,493,750 A | 2/1996 | Bollen et al. | |
| 5,546,627 A | 8/1996 | Chen | |
| 5,553,962 A | 9/1996 | Eustache | |
| 5,564,157 A | 10/1996 | Kushida et al. | |
| 5,572,764 A | 11/1996 | Fernandes et al. | |
| 5,606,766 A | 3/1997 | Lee | |
| 5,647,088 A | 7/1997 | Bommer et al. | |
| 5,724,700 A | 3/1998 | Marks | |
| 5,933,910 A | 8/1999 | Buechele et al. | |
| 5,946,764 A | 9/1999 | Tworzydlo | |
| 5,970,569 A | 10/1999 | Merkel et al. | |
| 5,970,570 A | 10/1999 | Groninger | |
| 6,000,093 A | 12/1999 | Charng | |
| 6,026,537 A | 2/2000 | Hojnacki | |
| 6,055,697 A | 5/2000 | Wollenschlaeger | |
| 6,158,078 A | 12/2000 | Kotlarski | |
| 6,161,248 A | 12/2000 | Merkel et al. | |
| 6,192,546 B1 | 2/2001 | Kotlarski | |
| 6,202,251 B1 | 3/2001 | Kotlarski | |
| 6,226,829 B1 | 5/2001 | Kotlarski | |
| 6,253,411 B1 | 7/2001 | Aichele et al. | |
| 6,266,843 B1 | 7/2001 | Doman et al. | |
| 6,279,191 B1 | 8/2001 | Kotlarski et al. | |
| 6,292,974 B1 | 9/2001 | Merkel et al. | |
| 6,336,243 B1 * | 1/2002 | Charng | 15/250.201 |
| 6,449,797 B1 | 9/2002 | De Block | |
| 6,523,218 B1 | 2/2003 | Kotlarski | |
| 6,634,055 B1 | 10/2003 | De Block | |
| 6,675,433 B1 | 1/2004 | Stewart et al. | |
| 6,675,434 B1 | 1/2004 | Wilhelm et al. | |
| 6,687,948 B2 | 2/2004 | Kotlarski | |
| 7,007,339 B2 | 3/2006 | Weiler et al. | |
| 7,228,588 B2 | 6/2007 | Kraemer et al. | |
| 7,337,900 B2 | 3/2008 | Reiber et al. | |
| 7,464,433 B2 | 12/2008 | Thomar et al. | |
| 7,484,264 B2 | 2/2009 | Kraemer et al. | |
| 7,523,519 B2 | 4/2009 | Egner-Walter et al. | |
| 7,603,742 B2 * | 10/2009 | Nakano et al. | 15/250.201 |
| 7,802,341 B2 | 9/2010 | Cempura et al. | |
| 7,836,541 B2 * | 11/2010 | Harita et al. | 15/250.04 |
| 8,151,406 B2 * | 4/2012 | Machida et al. | 15/250.201 |
| 8,181,308 B2 * | 5/2012 | Kwon et al. | 15/250.46 |
| 8,191,200 B2 | 6/2012 | Kim | |
| 8,266,759 B2 | 9/2012 | Braun et al. | |
| 8,347,450 B2 * | 1/2013 | Amano | 15/250.201 |
| 8,510,898 B2 * | 8/2013 | Ku | 15/250.44 |
| 8,671,505 B2 * | 3/2014 | Ku | 15/250.46 |
| 2005/0086759 A1 | 4/2005 | Torii et al. | |
| 2006/0207050 A1 | 9/2006 | Shanmugham et al. | |
| 2008/0201892 A1 | 8/2008 | Fujiwara et al. | |
| 2008/0235896 A1 | 10/2008 | Cheng | |
| 2008/0289133 A1 | 11/2008 | Kim | |
| 2010/0050361 A1 | 3/2010 | Chang et al. | |
| 2010/0281645 A1 | 11/2010 | Kim et al. | |
| 2011/0047740 A1 | 3/2011 | Weber | |
| 2011/0056041 A1 | 3/2011 | Wu | |
| 2011/0083295 A1 | 4/2011 | Kim et al. | |
| 2011/0162162 A1 | 7/2011 | Fujiwara et al. | |
| 2011/0277264 A1 | 11/2011 | Ehde | |
| 2012/0060315 A1 * | 3/2012 | Avasiloaie et al. | 15/250.32 |
| 2012/0060316 A1 | 3/2012 | Avasiloaie et al. | |
| 2012/0180245 A1 * | 7/2012 | Ku | 15/250.32 |

FOREIGN PATENT DOCUMENTS

| | | |
|---|---|---|
| DE | 1430589 | 12/1968 |
| DE | 1505397 | 10/1969 |
| DE | 2313939 | 9/1974 |
| DE | 3222864 | 12/1983 |
| DE | 8616349 | 8/1986 |
| DE | 3709810 | 10/1988 |
| DE | 19501849 | 8/1995 |
| DE | 19627115 | 1/1998 |
| DE | 19729865 | 1/1999 |
| DE | 19734843 | 2/1999 |
| DE | 19736368 | 2/1999 |
| DE | 19745460 A1 * | 4/1999 |
| DE | 19814610 | 10/1999 |
| DE | 19856300 | 6/2000 |
| DE | 10000372 | 8/2001 |
| DE | 19938661 B4 * | 9/2007 |
| EP | 0528643 | 2/1993 |
| EP | 0594451 | 4/1994 |
| EP | 0646507 | 4/1995 |
| EP | 1256496 | 11/2002 |
| EP | 1257445 | 11/2002 |
| FR | 1239780 | 8/1960 |
| FR | 2073561 | 10/1971 |
| FR | 2222853 | 10/1974 |
| FR | 2222855 | 10/1974 |
| FR | 2679185 | 1/1993 |
| FR | 2804393 | 8/2001 |
| GB | 939404 | 10/1963 |
| GB | 1055006 | 1/1967 |
| GB | 1425568 | 2/1976 |
| GB | 1429820 | 3/1976 |
| GB | 1447724 | 8/1976 |
| GB | 2005532 | 4/1979 |
| GB | 2102281 | 2/1983 |
| GB | 2106775 | 4/1983 |
| GB | 2346318 | 8/2000 |
| JP | 56139651 | 10/1981 |
| JP | 61215149 | 9/1986 |
| JP | 04108470 | 9/1992 |
| JP | 106931 | 1/1998 |
| JP | 2003312451 | 11/2003 |
| JP | 2005520736 | 7/2005 |
| JP | 2006312457 | 11/2006 |
| JP | 2008230340 | 10/2008 |
| JP | 2011251567 | 12/2011 |
| KR | 1020050007446 | 1/2005 |
| KR | 1020080094400 | 10/2008 |
| KR | 1020080105227 | 12/2008 |
| KR | 1020090042785 | 4/2009 |

(56) References Cited

FOREIGN PATENT DOCUMENTS

| | | |
|---|---|---|
| KR | 200449008 | 6/2010 |
| KR | 101201547 | 11/2012 |
| WO | 2007102404 | 9/2007 |

OTHER PUBLICATIONS

International Search Report for PCT/KR2013/005480, Completed by the Korean Patent Office on Sep. 2, 2013, 3 Pages.

* cited by examiner

WIPER BLADE ASSEMBLY

This application claims priority from Korean Patent Application No. 10-2012-0067982 filed on Jun. 25, 2012 in the Korean Intellectual Property Office, the disclosure of which is incorporated herein by reference in its entirety.

BACKGROUND OF THE INVENTION

1. Field of the Invention

The present invention relates to a wiper blade assembly, and more particularly, to a wiper blade assembly structured to better follow the curvature of glass.

2. Description of the Related Art

A wiper blade assembly wipes rain or dirt from a vehicle's windshield to ensure the driver's view. The wiper blade assembly is connected to a wiper arm connected to a driving shaft which is connected to a wiper driving motor on the vehicle side. Thus, the wiper blade is driven by the wiper arm.

The wiper arm and the wiper blade assembly are coupled to each other by a wiper connector. Generally, a member called a clamp is provided in the wiper blade assembly, and a connector member is coupled to the clamp. In a state where the connector member is coupled to the clamp, the wiper arm is coupled to the connector member.

Wiper blade assemblies are broadly classified into three types according to the way a blade closely attached to the surface of a windshield to wipe off dirt is supported.

The first type is a tournament-type wiper in which multi-stage levers are provided, and a blade is supported by ends of each lever.

The tournament-type wiper is the oldest form of wiper assembly. A wiper strip coupled to a linear support member is bent by a plurality of tournament levers to follow the curvature of the vehicle glass. The tournament-type wiper assembly has superior durability since the tournament levers form a stable support point and shows good wiping performance since it can properly follow the curvature of the glass.

However, when a vehicle is driven at high speed, the tournament-type wiper assembly is pulled away from the glass surface of the vehicle by the pressure of air acting on the glass surface. Accordingly, the wiping performance of the tournament-type wiper assembly deteriorates.

To solve this problem, a spoiler member is additionally attached onto each of the tournament levers. In this case, however, since the spoiler member should be additionally manufactured and assembled, the manufacturing costs and weight of parts increase. Also, the addition of the spoiler member impairs the appearance of the vehicle.

The second type is a flat plate-type wiper in which a blade is coupled to and thus supported by a support rail or body spring having a predetermined curvature and elasticity.

The flat plate-type wiper has a low height, is formed integrally with the blade, and has simple appearance.

However, since a windshield has a different curvature according to the vehicle model, it is difficult to perfectly wipe the entire area of the windshield no matter how excellent the elasticity of the body spring is. In addition, when the wiper moves to a point with a different curvature, ends of the wiper may fail to follow the curvature of the windshield, that is, may lift off the surface of the windshield.

To address these problems, a uniblade-type wiper, which is the third type, has been suggested. In the uniblade-type wiper, a flat plate-type wiper is reinforced and supported by a tournament structure.

That is, in a uniblade-type wiper assembly, two tournament levers are installed only in the middle of a tournament wiper strip, and the tournament levers are covered with a cover having a spoiler function and then coupled to the cover.

However, since both ends of the wiper strip are not properly supported in the uniblade-type wiper assembly, the uniblade-type wiper assembly cannot properly follow the curvature of glass.

SUMMARY OF THE INVENTION

Aspects of the present invention provide a wiper blade assembly which can better follow a curvature of glass since both ends of a wiper strip are supported more securely.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a wiper blade assembly including: a primary lever including a spoiler portion; and a secondary lever disposed on a side of the primary lever and hinge-coupled to the spoiler portion of the primary lever, further comprise support portions are disposed on an inner surface of the spoiler portion of the primary lever and prevent the movement of the secondary lever.

The support portions include a first support portion and a second support portion, and the secondary lever includes a hinge-coupling portion hinge-coupled to the primary lever, a spoiler portion disposed on a side of the hinge-coupling portion, and an extension portion disposed on the other side of the hinge-coupling portion, wherein the first support portion supports the extension portion, and the second support portion supports the hinge-coupling portion.

The first support portion includes a first support wall separated from an inner wall of the spoiler portion of the primary lever by a predetermined distance and a second support wall separated from the other inner wall of the spoiler portion of the primary lever by a predetermined distance, and the second support portion includes a third support wall separated from an inner wall of the spoiler portion of the primary lever by a predetermined distance and a fourth support wall separated from the other inner wall of the spoiler portion of the primary lever by a predetermined distance.

The hinge-coupling portion includes a first protruding portion which is inserted into a gap between the third support wall and the fourth support wall to be supported by the third support wall and the fourth support wall.

The hinge-coupling portion includes a groove, wherein the first protruding portion is formed narrower than other regions of the hinge-coupling portion due to the groove.

The extension portion includes a second protruding portion which is inserted into a gap between the first support wall and the second support wall to be supported by the first support wall and the second support wall.

The gap between the third support wall and the fourth support wall is equal to the gap between the first support wall and the second support wall.

The second support portion further includes any one of hinge-coupling protrusions and hinge-coupling grooves, and the hinge coupling portion further includes the other one of the hinge-coupling protrusions and the hinge-coupling grooves, wherein the hinge-coupling protrusions and the hinge-coupling grooves are hinge-coupled to each other.

The wiper blade assembly further includes a yoke member coupled to the secondary lever, wherein the secondary lever includes any one of a hinge protrusion and a hinge hole, and the yoke member includes the other one of the hinge protrusion and the hinge hole, wherein the hinge hole is hinge-coupled to the hinge protrusion.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1A:
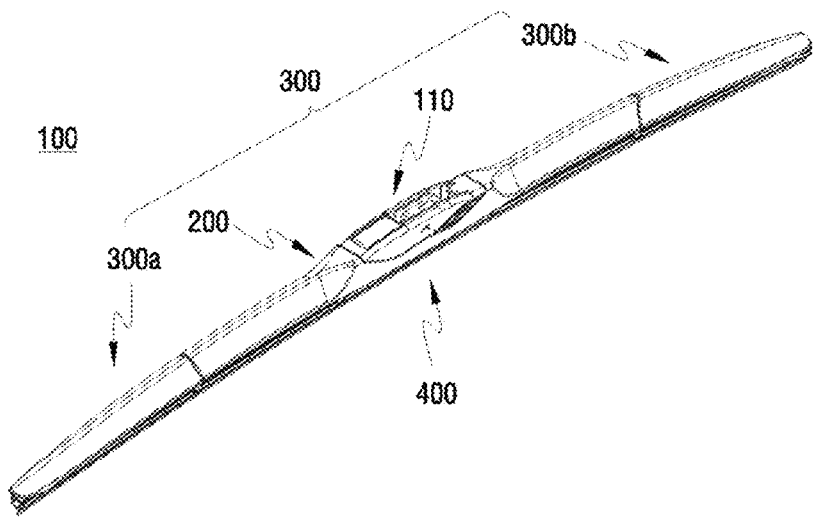
FIG. 1A is a coupled perspective view of a wiper blade assembly according to the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

The present invention will now be described more fully with reference to the accompanying drawings, in which exemplary embodiments of the invention are shown. Like reference numerals refer to like elements throughout the specification. As used herein, the term "and/or" includes any and all combinations of one or more of the associated listed items.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the present invention.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated elements, but do not preclude the presence or addition of one or more other elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" or "beneath" can encompass both an orientation of above and below. The device may be otherwise oriented and the spatially relative descriptors used herein interpreted accordingly.

Hereinafter, exemplary embodiments of the present invention will be described in detail with reference to the attached drawings.

Figure 1B:
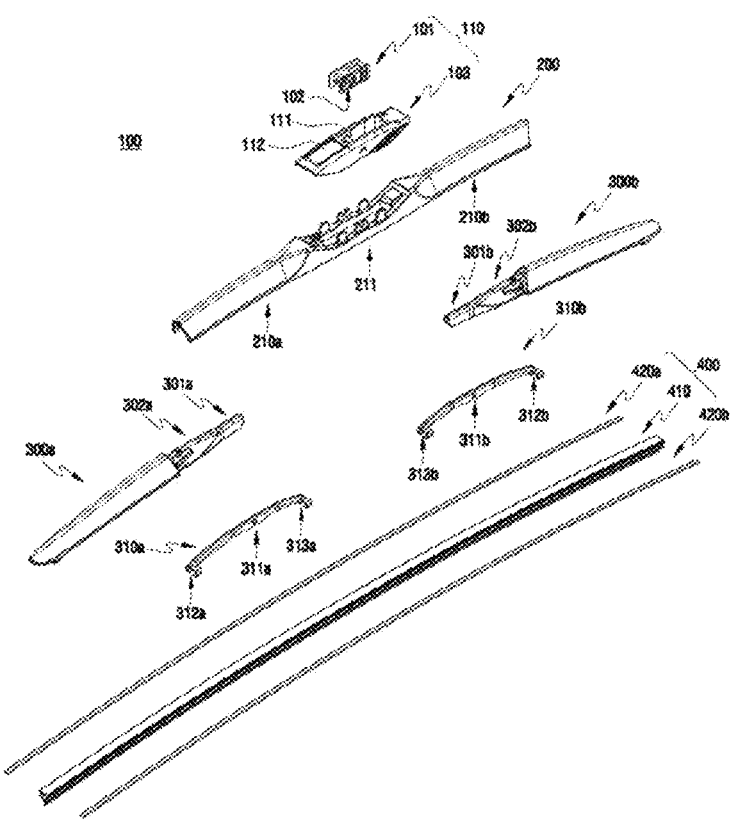
FIG. 1B is an exploded perspective view of the wiper blade assembly according to the present invention.

FIG. 1A is a coupled perspective view of a wiper blade assembly 100 according to the present invention. FIG. 1B is an exploded perspective view of the wiper blade assembly 100 according to the present invention.

Referring to FIGS. 1A and 1B, the wiper blade assembly 100 according to the present invention includes a primary lever 200, secondary levers 300 located respectively on both sides of the primary lever 200, yoke members 310a and 310b hinge-coupled to the secondary levers 300, and a contact member 400 coupled to the yoke members 310a and 310b. Further, the wiper blade assembly 100 includes a first connecting part 110 which is coupled to a region 211 of the primary lever 200 and is connected to a wiper arm.

First, the contact member 400 may include a wiper strip 410 and support members 420a and 420b which support the wiper strip 410.

The wiper strip 410 is typically made of a rubber material. The wiper strip 410 includes grooves (no reference numerals given) on both sides thereof to be coupled to the support members 420a and 420b.

The support members 420a and 420b are typically elastic and support the wiper strip 410. The support members 420a and 420b may be inserted into the grooves formed on both sides of the wiper strip 410. In the drawings, two separate support members, i.e., a first support member 420a and a second support member 420b are illustrated. However, the wiper strip 410 can also be supported by a single support member.

In the present invention, the contact member 400 can vary according to the needs of a user. Therefore, the shape and structure of the contact member 400 are not limited in the present invention.

The yoke members 310a and 310b include a first yoke member 310a and a second yoke member 310b. The first yoke member 310a and the second yoke member 310b include hinge holes 311a and 311b to be hinge-coupled to the secondary levers 300, respectively.

More specifically, the first yoke member 310a includes a first hinge hole 311a, and the second yoke member 310b includes a second hinge hole 311b. The first and second hinge holes 311a and 311b may be hinge-coupled to hinge protrusions of the secondary levers 300, respectively.

That is, as will be described later, the secondary levers 300 include a first secondary lever 300a and a second secondary lever 300b. The first secondary lever 300a includes a first hinge protrusion on an inner surface thereof, and the second secondary lever 300b includes a second hinge protrusion on an inner surface thereof. Therefore, the first hinge hole 311a may be hinge-coupled to the first hinge protrusion, and the second hinge hole 311b may be hinge-coupled to the second hinge protrusion.

Although not shown in the drawings, the yoke members 310a and 310b may include hinge protrusions, and the secondary levers 300 may include hinge holes. Thus, the hinge protrusions and the hinge holes may be hinge-coupled to each other.

That is, the first yoke member 310a may include a first hinge protrusion, and the second yoke member 310b may include a second hinge protrusion. In addition, the first secondary lever 300a may include a first hinge hole in the inner surface thereof, and the second secondary lever 300b may include a second hinge hole in the inner surface thereof. Thus, the first hinge hole may be hinge-coupled to the first hinge protrusion, and the second hinge hole may be hinge-coupled to the second hinge protrusion.

In summary, a secondary lever may include any one of a hinge protrusion and a hinge hole in the inner surface thereof, and a yoke member may include the other one of the hinge protrusion and the hinge hole. Thus, the hinge hole may be hinge-coupled to the hinge protrusion.

The yoke members 310a and 310b slidably support the support members 420a and 420b, respectively. The first yoke member 310a may include first claws 312a and 313a at both ends thereof, respectively. The second yoke member 310b may include second claws 312b and 313b at both ends thereof, respectively.

Here, the yoke members 310a and 310b may be identical to yokes used in a conventional tournament-type wiper assembly. Therefore, the shape and structure of the yoke members are not limited in the present invention.

The primary lever 200 is hinge-coupled to the secondary levers 300 which will be described later. The primary lever 200 includes a first spoiler portion 210a, which is hinge-coupled to the first secondary lever 300a, on a side thereof and a second spoiler portion 210b, which is hinge-coupled to the second secondary lever 300b, on the other side thereof. In addition, the first connecting part 110 is coupled to the region 211 of the primary lever 200 and is connected to the wiper arm.

The first connecting part 110 will now be described in greater detail with reference to FIG. 5.

Figure 5:
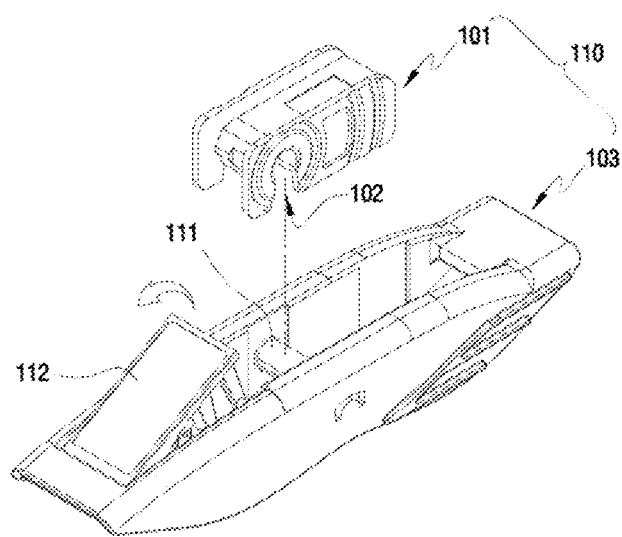
FIG. 5 is a perspective view of a first connecting part according to the present invention.

FIG. 5 is a perspective view of the first connecting part 110 according to the present invention.

Referring to FIGS. 1B and 5, as described above, the first connecting part 110 is connected to the wiper arm. The first connecting part 110 may include a frame 103 and a clip member 101 coupled to the frame 103.

The frame 103 is generally called an adapter. The frame 103 includes a cap 112 which is installed at an end of the frame 103 to be hinge-opened or closed and a connecting pin 111 which is coupled to the clip member 101.

The clip member 101 is generally called a wiper arm connector. The clip member 101 may be housed in the frame 103 and connected to the wiper arm (not shown) having a U-shaped hook at a tip end thereof.

The clip member 101 may include a pinhole 102 which is coupled to the connecting pin 111 of the frame 103. The pinhole 102 may be inserted into or removed from the connecting pin 111 by interference fit.

Figure 6:
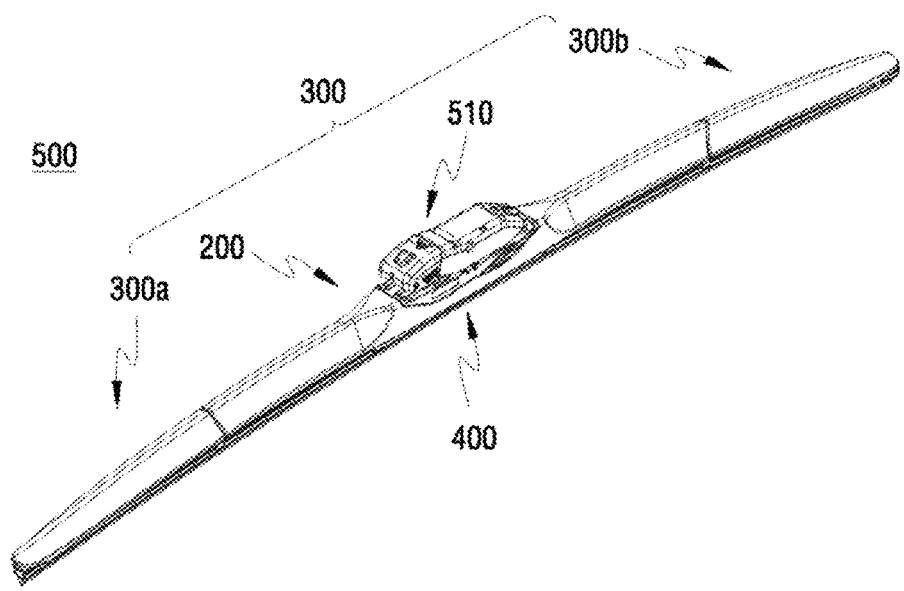
FIG. 6 is a coupled perspective view of a second connecting part according to another example of the present invention.

The first connecting part 110 according to the present invention corresponds to a first embodiment and can be replaced by a second connecting part 510 shown in FIG. 6.

FIG. 6 is a coupled perspective view of the second connecting part 510 according to another example of the present invention. The wiper blade assembly 100 can be connected to the wiper arm by the second connecting part 510 shown in FIG. 6.

That is, the first connecting part 110 or the second connecting part 510 according to the present invention can be employed or replaced according to the type of the wiper arm. Therefore, in the present invention, the shape and structure of the connecting part are not limited. For example, an adapter disclosed in Korean Patent Registration No. 10-1036577 by the present applicant can also be used.

The primary lever 200 will now be described with reference to FIGS. 2A through 2D.

Figure 2A:
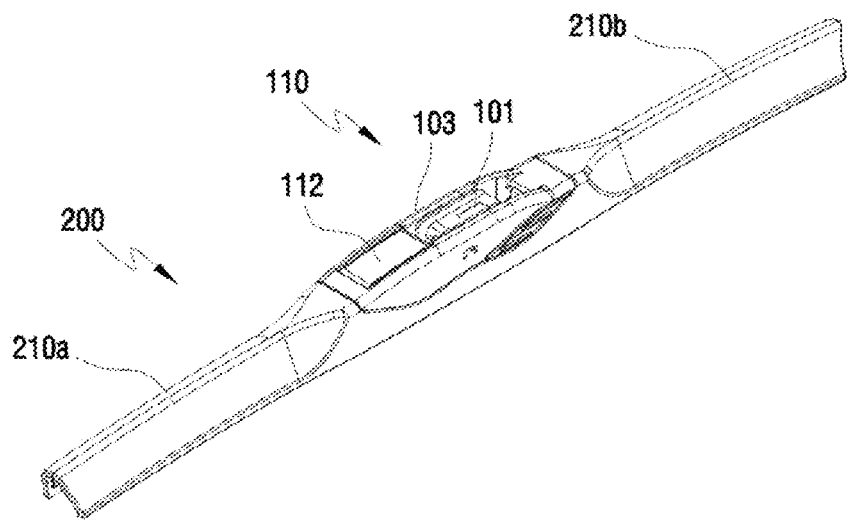
FIG. 2A is a perspective view of a primary lever according to the present invention.
Figure 2B:
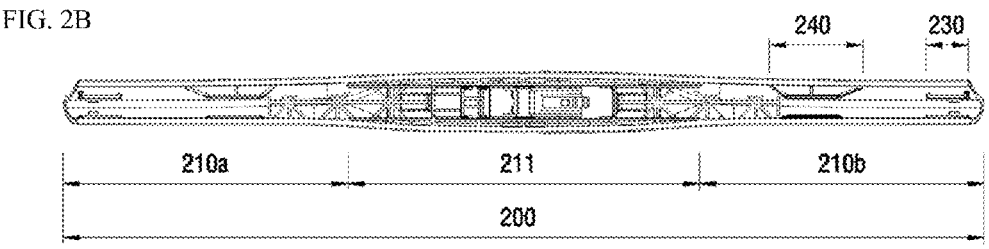
FIG. 2B is a bottom view of the primary lever according to the present invention.
Figure 2C:
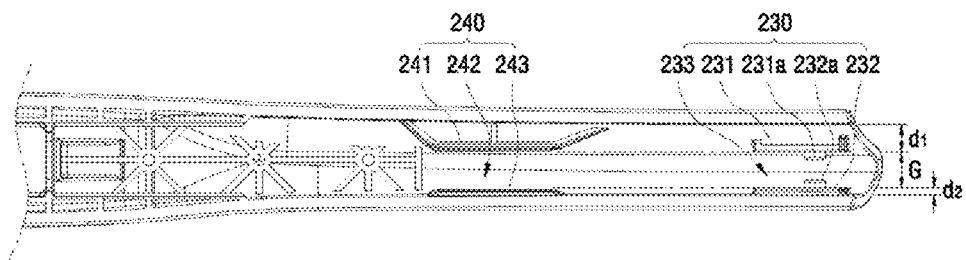
FIG. 2C is a bottom view of a second spoiler portion of the primary lever according to the present invention.

FIG. 2A is a perspective view of the primary lever 200 according to the present invention. FIG. 2B is a bottom view of the primary lever 200 according to the present invention. FIG. 2C is a bottom view of the second spoiler portion 210b of the primary lever 200 according to the present invention. For simplicity, only the second spoiler portion 210b of the primary lever 200 will be described below. It can be understood that the structure of the first spoiler portion 210a of the primary lever 200 is horizontally symmetrical to that of the second spoiler portion 210b of the primary lever 200.

Referring to FIG. 2A, as described above, the primary lever 200 according to the present invention includes the first spoiler portion 210a, which is hinge-coupled to the first secondary lever 300a, on a side thereof and the second spoiler portion 210b, which is hinge-coupled to the second secondary lever 300b, on the other side thereof. The region 211 of the primary lever 200 is where the first or second connecting part 110 or 510 described above can be located.

That is, the first and second spoiler portions 210a and 210b of the primary lever 200 are formed integrally in the primary lever 200. The first and second spoiler portions 210a and 210b may induce air flowing toward a vehicle's windshield glass to press the primary lever 200 toward the windshield glass during a wiping operation.

The term "spoiler portions" is used to define both sides of the primary lever 200 because both sides of the primary levers 200 function as spoilers. In the present invention, however, both sides of the primary lever 200 are not limited by the meaning of the term. Other suitable terms can also be used.

Support portions for preventing the movement of the second secondary lever 300b are formed on an inner surface of the second spoiler portion 210b of the primary lever 200. The support portions support the second secondary lever 300b to prevent the second secondary lever 300b from moving on the inner surface of the second spoiler portion 210b of the primary lever 200 when a wiper is or is not in operation.

More specifically, the support portions may include a first support portion 240 and a second support portion 230. The first support portion 240 supports a second extension portion 301b located on a side of a hinge-coupling portion 302b which will be described later, and the second support portion 230 supports the second hinge-coupling portion 302b.

The first support portion 240 includes a first support wall 241, a second support wall 243, and a first space 242. The first support wall 241 is separated from one inner wall of the second spoiler portion 210b of the primary lever 200 by a predetermined distance d1, the second support wall 243 is separated from the other inner wall of the second spoiler portion 210b of the primary lever 200 by a predetermined distance d2, and the first space 242 is formed between the first support wall 241 and the second support wall 243.

In addition, the second support portion 230 includes a third support wall 231, a fourth support wall 232, and a second space 233. The third support wall 231 is separated from the one inner wall of the second spoiler portion 210b of the primary lever 200 by the predetermined distance d1, the fourth support wall 232 is separated from the other inner wall of the second spoiler portion 210b of the primary lever 200 by the predetermined distance d2, and the second space 233 is formed between the third support wall 231 and the fourth support wall 232.

As described above, the second support portion 230 is designed to support the second hinge-coupling portion 302b of the second secondary lever 300b. That is, the second support portion 230 is coupled to the second hinge-coupling portion 302b of the second secondary lever 300b in the region of the second support portion 230. Therefore, the second support portion 230 may include hinge-coupling protrusions 231a and 232a to be coupled to the second hinge-coupling portion 302b of the second secondary lever 300b.

Although not shown in the drawings, the hinge-coupling protrusions 231a and 232a of the second support portion 230 may be hinge-coupling grooves. Therefore, the second support portion 230 according to the present invention may include any one of hinge-coupling protrusions and hinge-coupling grooves to be coupled to the second hinge-coupling portion 302b of the second secondary lever 300b.

In the present invention, the first space 242 and the second space 233 may be the same size. That is, a gap G between the first support wall 241 and the second support wall 243 may be equal to a gap G between the third support wall 231 and the fourth support wall 232.

The secondary levers 300 may include the first secondary lever 300a hinge-coupled to a side of the primary lever 200 and the second secondary lever 300b hinge-coupled to the other side of the primary lever 200.

Each of the secondary levers 300 may include a hinge-coupling portion, a spoiler portion located on a side of the hinge-coupling portion, and an extension portion located on the other side of the hinge-coupling portion.

More specifically, the first secondary lever 300a may include a first hinge-coupling portion 302a hinge-coupled to the primary lever 200, a first spoiler portion (no reference numeral given) located on a side of the first hinge-coupling portion 302a, and a first extension portion 301a located on the other side of the first hinge-coupling portion 302a. The second secondary lever 300b may include the second hinge-coupling portion 302b hinge-coupled to the primary lever 200, a second spoiler portion (no reference numeral given) located on a side of the second hinge-coupling portion 302b, and the second extension portion 301b located on the other side of the second hinge-coupling portion 302b.

The secondary levers 300 will now be described in greater detail with reference to FIGS. 3A through 3C.

Figure 3A:
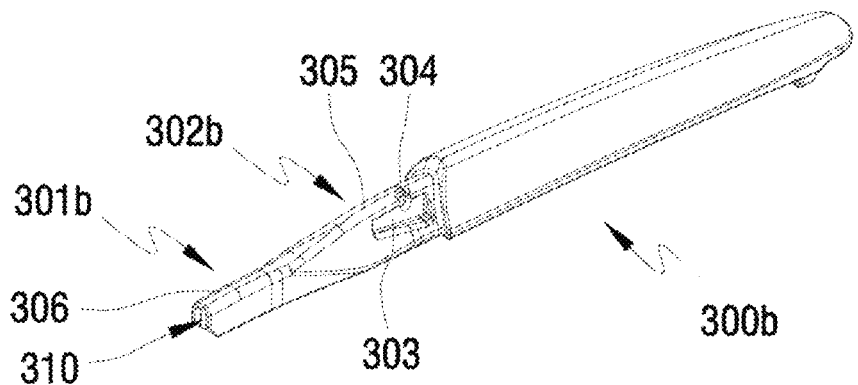
FIG. 3A is a perspective view of a second secondary lever according to the present invention.

FIG. 3A is a perspective view of the second secondary lever 300b according to the present invention. FIG. 3B is a plan view of the second secondary lever 300b according to the present invention. FIG. 3C is a bottom view of the second secondary lever 300b according to the present invention. For simplicity, only the second secondary lever 300b will be described below. It can be understood that the structure of the second secondary lever 300b is horizontally symmetrical to that of the first secondary lever 300a.

As described above, the second secondary lever 300b may include the second hinge-coupling portion 302b hinge-coupled to the primary lever 200, the second secondary lever spoiler portion (no reference numeral given) located on a side of the second hinge-coupling portion 302b, and the second extension portion 301b located on the other side of the second hinge-coupling portion 302b.

More specifically, the second hinge-coupling portion 302b includes hinge-coupling grooves 304 coupled to the hinge-coupling protrusions 231a and 232a and a first protruding portion 305 supported by the third and fourth support walls 231 and 232 of the second support portion 230.

Although not shown in the drawings, the hinge-coupling grooves 304 of the second hinge-coupling portion 302b may be hinge-coupling protrusions. Therefore, the second hinge-coupling portion 302b according to the present invention may include any one of hinge-coupling protrusions and hinge-coupling grooves to be hinge-coupled to the second support portion 230.

That is, when the second support portion 230 includes hinge-coupling protrusions, the second hinge-coupling portion 302b may include hinge-coupling grooves. Conversely, when the second support portion 230 includes hinge-coupling protrusions, the second hinge-coupling portion 302b may include hinge-coupling protrusions. Thus, the hinge coupling protrusions may be hinge-coupled to the hinge coupling grooves.

Figure 3B:
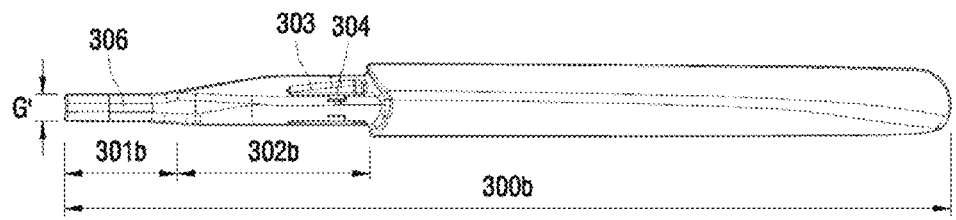
FIG. 3B is a plan view of the second secondary lever according to the present invention.

Referring to FIGS. 3A and 3B, the first protruding portion 305 has a smaller width G' than other regions of the second hinge-coupling portion 302b. That is, a groove 303 is formed in the second hinge-coupling portion 302b. Thus, the first protruding portion 305 can be inserted into the gap G between the third support wall 231 and the fourth support wall 232. Accordingly, the hinge-coupling portion 302b can be supported by the second support portion 230.

Also, the second extension portion 301b includes a second protruding portion 306 supported by the first support wall 241 and the second support wall 243. A size of the second protruding portion 306 is equal to the width G' of the first protruding portion 305. Thus, the second protruding portion 306 can be inserted into the gap G between the first support wall 241 and the second support wall 243. Accordingly, the second extension portion 301b can be supported by the first support portion 240.

Figure 3C:
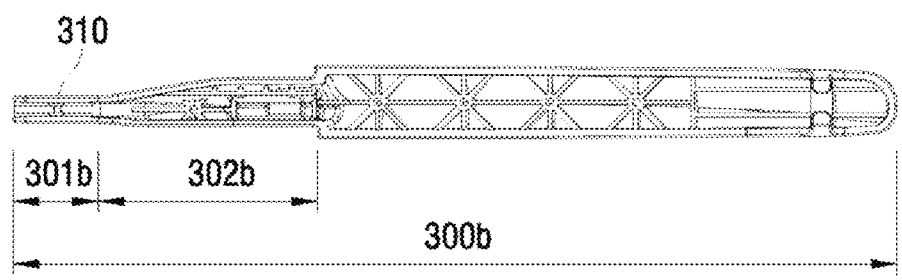
FIG. 3C is a bottom view of the second secondary lever according to the present invention.

Referring to FIG. 3C, the second hinge protrusion 310 is formed on an inner wall of the second extension portion 301b. As the second hinge protrusion 310 is coupled to the second hinge hole 311b of the second yoke member 310b, the second yoke member 310b is hinge-coupled to the second secondary lever 300b.

Figure 4:
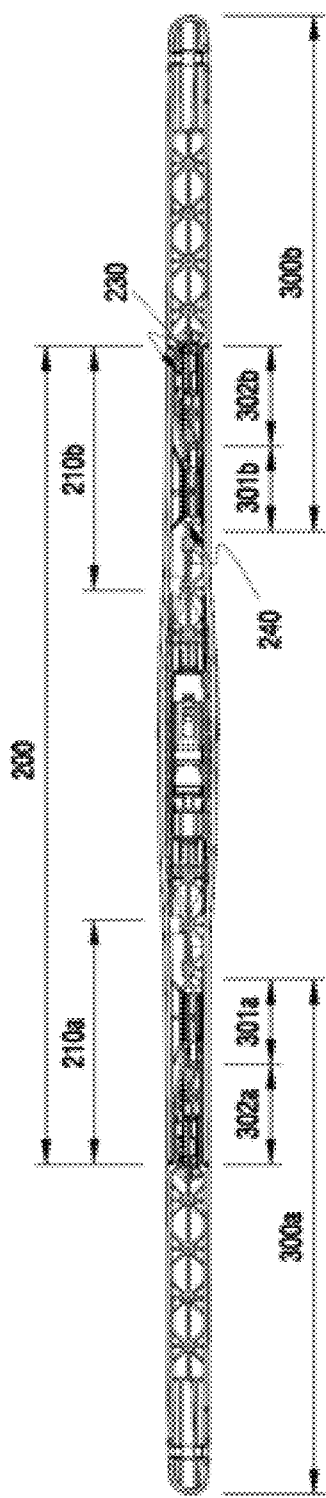
FIG. 4 is a bottom view showing the primary lever coupled to the secondary levers according to the present invention.

FIG. 4 is a bottom view showing the primary lever 200 coupled to the secondary levers 300 according to the present invention.

Referring to FIG. 4, the primary lever 200 according to the present invention includes the first spoiler portion 210a, which is hinge-coupled to the first secondary lever 300a, on a side thereof and the second spoiler portion 210b, which is hinge-coupled to the second secondary lever 300b, on the other side thereof.

In addition, the secondary levers 300 according to the present invention may include the first secondary lever 300a hinge-coupled to a side of the primary lever 200 and the second secondary lever 300b hinge-coupled to the other side of the primary lever 200.

More specifically, the first secondary lever 300a may include the first hinge-coupling portion 302a hinge-coupled to the primary lever 200, the first spoiler portion (no reference numeral given) located on a side of the first hinge-coupling portion 302a, and the first extension portion 301a located on the other side of the first hinge-coupling portion 302a. The second secondary lever 300b may include the second hinge-coupling portion 302b hinge-coupled to the primary lever 200, the second spoiler portion (no reference numeral given) located on a side of the second hinge-coupling portion 302b, and the second extension portion 301b located on the other side of the second hinge-coupling portion 302b.

Each spoiler portion of the primary lever 200, e.g., the second spoiler portion 210b of the primary lever 200 may include the first support portion 240 and the second support portion 230. The first support portion 240 may support the second extension portion 301b located on the other side of the second hinge-coupling portion 302b, and the second support portion 230 may support the second hinge coupling portion 302b.

That is, in the present invention, support portions for preventing the movement of a secondary lever are formed on an inner surface of a spoiler portion of a primary lever. The support portions support the secondary lever to prevent the secondary lever from moving on the inner surface of the spoiler portion of the primary lever when a wiper is or is not in operation.

Therefore, in the present invention, both ends of a wiper strip connected to the secondary lever can be supported properly. This enables the wiper to better follow the curvature of glass, thereby improving the wiping performance of the wiper.

In addition, since the secondary lever is prevented from moving on the inner surface of the spoiler portion of the primary lever, it can be prevented from vibrating in a horizontal direction of a wiper blade. Accordingly, this suppresses chattering during a wiping operation, thus ensuring superior wiping performance.

According to the present invention, support portions for preventing the movement of a secondary lever are formed on an inner surface of a spoiler portion of a primary lever. The support portions support the secondary lever to prevent the secondary lever from moving on the inner surface of the spoiler portion of the primary lever when a wiper is or is not in operation.

In the present invention, both ends of a wiper strip connected to the secondary lever can be supported properly. This enables the wiper to better follow the curvature of glass, thereby improving the wiping performance of the wiper.

In addition, since the secondary lever is prevented from moving on the inner surface of the spoiler portion of the primary lever, it can be prevented from vibrating in a horizontal direction of a wiper blade. Accordingly, this suppresses chattering during a wiping operation, thus ensuring superior wiping performance.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A wiper blade assembly comprising:
a primary lever comprising a spoiler portion; and
a secondary lever disposed on a side of the primary lever, the secondary lever including a hinge-coupling portion to be hinge-coupled to the primary lever, an extension portion disposed on one side end of the hinge-coupling portion, and a spoiler portion disposed on an other side of the hinge-coupling portion;
a hinge coupled to the spoiler portion of the primary lever;
support portions disposed on an inner surface of the spoiler portion of the primary lever and preventing movement of the secondary lever, the support portions comprise a first support portion comprises;
a first support wall separated from an inner wall of the spoiler portion of the primary lever by a predetermined distance, and
a second support wall separated from an opposing inner wall of the spoiler portion of the primary lever by a predetermined distance, a first space formed between the first support wall and the second support wall; and
a second support portion to support the hinge-coupling portion,
wherein the second support portion includes any one of hinge-coupling protrusions and hinge-coupling grooves, and the hinge-portion includes an other one of hinge-coupling protrusions and hinge-coupling grooves, and the hinge-coupling protrusions are hinge-coupled to the hinge-coupling grooves,
wherein each of the first support wall and the second support wall project inwardly from opposing inner walls of the primary lever to contact the extension portion, and
wherein the extension portion is inserted into the first space to be supported.

2. The wiper blade assembly of claim 1, wherein the second support portion comprises a third support wall separated from an inner wall of the spoiler portion of the primary lever by a predetermined distance, a fourth support wall separated from the other inner wall of the spoiler portion of the primary lever by a predetermined distance, and a second space formed between the third support wall and the fourth support wall.

3. The wiper blade assembly of claim 2, wherein the hinge-coupling portion comprises a first protruding portion which is inserted into the second space formed between the third support wall and the fourth support wall to be supported by the third support wall and the fourth support wall.

4. The wiper blade assembly of claim 3, wherein the hinge-coupling portion comprises a groove, wherein the first protruding portion is formed narrower than other regions of the hinge-coupling portion due to the groove.

5. The wiper blade assembly of claim 2, wherein the extension portion comprises a second protruding portion which is inserted into the first space formed between the first support wall and the second support wall to be supported by the first support wall and the second support wall.

6. The wiper blade assembly of claim 2, wherein a gap between the third support wall and the fourth support wall is equal to the gap between the first support wall and the second support wall.

7. The wiper blade assembly of claim 1, further comprising a yoke member coupled to the secondary lever, wherein the secondary lever comprises any one of a hinge protrusion and a hinge hole, and the yoke member comprises the other one of the hinge protrusion and the hinge hole, wherein the hinge hole is hinge-coupled to the hinge protrusion.

8. The wiper blade assembly of claim 1, further comprising a connecting part coupled to the primary lever and connected to a wiper arm, wherein the connecting part is replaceable according to a type of the wiper arm.

9. A wiper blade assembly comprising:
an elongate primary lever comprising a spoiler portion, and support portions disposed on inner surfaces of the primary lever; and
a secondary lever defining a hinge-coupling portion to be hinge-coupled to an end of the primary lever and an extension portion at a distal end of the secondary lever, the hinge-coupling portion including one of hinge-coupling protrusions and hinge-coupling grooves;
wherein the support portions comprise:
a first support portion defining a first support wall and a second support wall, each protruding inwardly from the opposing inner surfaces by a respective predetermined distance to define a first space formed between the first and second support walls to receive the extension portion of the secondary lever,
a second support portion defining a third support wall and a fourth support wall, each protruding inwardly from the opposing inner surfaces by a respective predetermined distance to define a second space formed between the third and fourth support walls, the second support portion including an other one of the hinge-coupling protrusions and the hinge-coupling grooves, and
hinge protrusions extending from each of the third and fourth support walls to engage the hinge-coupling portion of the secondary lever,
wherein the secondary lever is inserted into each of the first space and the second space of the primary lever, and the secondary lever is allowed to pivot about the hinge protrusions and is restricted from lateral movement relative to the primary lever, and
wherein the hinge-coupling protrusions are hinge-coupled to the hinge coupling grooves.

10. A wiper blade assembly comprising:
a primary lever comprising a spoiler portion; and
a secondary lever disposed on a side of the primary lever including a hinge-coupling portion to be hinge-coupled to the primary lever, an extension portion disposed on one side end of the hinge-coupling portion, and a spoiler portion disposed on an other side of the hinge-coupling portion;
a hinge coupled to the spoiler portion of the primary lever, and
support portions disposed on an inner surface of the spoiler portion of the primary lever and preventing movement of the secondary lever, the support portions including a first support portion and a second support portion, the first support portion comprises:
a first support wall separated from an inner wall of the spoiler portion of the primary lever by a predetermined distance, and
a second support wall separated from an opposing inner wall of the spoiler portion of the primary lever by a predetermined distance, a first space formed between the first support wall and the second support wall,
the second support portion comprises:
a third support wall separated from an inner wall of the spoiler portion of the primary lever by a predetermined distance, and
a fourth support wall separated from the other inner wall of the spoiler portion of the primary lever by a predetermined distance, a second space formed between the third support wall and the fourth support wall,
wherein each of the first support wall and the second support wall project inwardly from opposing inner walls of the primary lever to contact the extension portion,
wherein the extension portion is inserted into the first space to be supported, and
wherein the hinge-coupling portion includes a first protruding portion that is inserted into the second space formed between the third support wall and the fourth support wall to be supported by the third support wall and the fourth support wall, the hinge-coupling portion further including a groove, and the first protruding portion is formed narrower than other regions of the hinge-coupling portion due to the groove.

* * * * *